US008638875B1

(12) United States Patent
Zhang et al.

(10) Patent No.: US 8,638,875 B1
(45) Date of Patent: Jan. 28, 2014

(54) TRANSMIT BEAMFORMING SYSTEMS AND METHODS

(75) Inventors: Hongyuan Zhang, Sunnyvale, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 560 days.

(21) Appl. No.: 12/407,345

(22) Filed: Mar. 19, 2009

Related U.S. Application Data

(60) Provisional application No. 61/045,050, filed on Apr. 15, 2008.

(51) Int. Cl.
*H04L 27/00* (2006.01)
*H04L 1/02* (2006.01)
*H04K 1/10* (2006.01)
*H04B 7/02* (2006.01)

(52) U.S. Cl.
USPC ............ 375/295; 375/267; 375/260; 375/296

(58) Field of Classification Search
USPC .......................... 375/260, 299, 347, 267, 309; 455/562.1, 115.1, 67.14, 260, 267
See application file for complete search history.

(56) References Cited

U.S. PATENT DOCUMENTS

| | | | |
|---|---|---|---|
| 5,055,841 A | 10/1991 | Cordell | |
| 5,231,485 A | 7/1993 | Israelsen et al. | |
| 5,343,195 A | 8/1994 | Cooper | |
| 5,528,238 A | 6/1996 | Nickerson | |
| 5,623,262 A | 4/1997 | Normile et al. | |
| 5,625,356 A | 4/1997 | Lee et al. | |
| 5,646,618 A | 7/1997 | Walsh | |
| 5,748,121 A | 5/1998 | Romriell | |
| 6,049,607 A | 4/2000 | Marash et al. | |
| 6,363,033 B1 | 3/2002 | Cole et al. | |
| 6,614,365 B2 | 9/2003 | Suzuki et al. | |
| 6,658,141 B1 | 12/2003 | Jeong | |
| 7,715,880 B2 * | 5/2010 | Nakao | 455/562.1 |

(Continued)

FOREIGN PATENT DOCUMENTS

WO WO-2008109790 A1 9/2008

OTHER PUBLICATIONS

S. Guncavdi, et al. "A Space-Time Pre-RAKE Transmitter Diversity Method for W-CDMA Using Long Range Prediction," Proceedings of 35$^{th}$ Annual Conference on Information Sciences and Systems, CISS'01, vol. 1, pp. 32-37, Mar. 2001.

(Continued)

*Primary Examiner* — Shuwang Liu
*Assistant Examiner* — Ross Varndell

(57) ABSTRACT

A system includes a transmitting module, a mapping module, and an updating module. The transmitting module transmits a first set of data streams using N subcarriers when a wireless device operates in a first mode. The transmitting module transmits a second set of data streams using M subcarriers when the device operates in a second mode. N and M are integers greater than or equal to 1. The mapping module maps the first set of data streams to a first set of antennas of the device based on a first set of mapping values and maps the second set of data streams to a second set of antennas of the device based on a second set of mapping values. The updating module generates the second set of mapping values based on the first set of mapping values when the device transitions from the first mode to the second mode.

20 Claims, 8 Drawing Sheets

(56) References Cited

U.S. PATENT DOCUMENTS

| | | | |
|---|---|---|---|
| 7,894,538 B2* | 2/2011 | Walton et al. | 375/260 |
| 7,899,110 B1 | 3/2011 | Zhang et al. | |
| 2001/0022783 A1 | 9/2001 | Ohki | |
| 2002/0176488 A1 | 11/2002 | Kober et al. | |
| 2002/0193146 A1 | 12/2002 | Wallace et al. | |
| 2003/0085822 A1 | 5/2003 | Scheuermann | |
| 2005/0047515 A1 | 3/2005 | Walton et al. | |
| 2006/0039493 A1 | 2/2006 | Mukkavilli et al. | |
| 2006/0056534 A1 | 3/2006 | Ionescu et al. | |
| 2006/0072485 A1 | 4/2006 | Cairns et al. | |
| 2006/0092054 A1 | 5/2006 | Li et al. | |
| 2007/0226287 A1 | 9/2007 | Lin et al. | |
| 2007/0297498 A1 | 12/2007 | Kramer | |
| 2009/0190642 A1 | 7/2009 | Brueninghaus et al. | |
| 2009/0225823 A1 | 9/2009 | Chen et al. | |
| 2009/0225876 A1 | 9/2009 | Sung et al. | |
| 2009/0310586 A1 | 12/2009 | Shatti | |
| 2010/0321216 A1 | 12/2010 | Jonsson et al. | |
| 2013/0070715 A1 | 3/2013 | Nanda et al. | |

OTHER PUBLICATIONS

R. Irmer, et al. "MISO concepts for frequency-selective channels," International Zurich Seminar on Broadband Communications, IZS'02, pp. 40/1-40/6, Zurich, Switzerland,. Feb. 19-21, 2002.

V. Erceg, et al., "IEEE P802.11: Wireless LANs: TGn Channel Models," Doc.: IEEE 802.11-03/940r4, May 2004.

U.S. Appl. No. 12/044,117, filed Mar. 7, 2008, "Codebook Selection for Transmit Beamforming", Hongyuan Zhang et al., 39 pages.

U.S. Appl. No. 12/059,846, filed Mar. 31, 2008, "Method and Apparatus for Transmit Beamforming", Hongyuan Zhang et al., 64 pages.

IEEE P802.11n™/D3.00, Sep. 2007; Draft Standard for Information Technology-Telecommunciatins and information exchange between systems—Local and metropolitan area networks—Specific requirements—Part 11: Wireless LAN Medium Access Control (MAC) and Physical Layer (PHY) specifications: Amendment 4: Enhancements for Higher Throughput; 802.11 Working Group of the 802 Committee;544 pages.

IEEE P802.11 Wireless LANs; TGn Sync Proposal Technical Specification; May 18, 2005; Syed Aon Mujtaba; Agere Systems Inc.; 134 pages.

IEEE P802.11g/D8.2, Apr. 2003 (Supplement to Ansi/IEEE Std 802.11 1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standard Committee of the IEEE Computer Society; 69 pages.

IEEE P802.11a-1999 (Supplement to IEEE Std 802.11-1999); Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications; High-speed Physical Layer in the 5 GHz Band; LAN/MAN Standards Committee of the IEEE Computer Society; 91 pages.

IEEE P802.11b-1999 (Supplement to ANSI/IEEE Std 802.11 1999 Edition); Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications; Higher-speed Physical Layer Extension in the 2.4 GHz Band; LAN/MAN Standards Committee of the IEEE Computer Society; Sep. 16, 1999; 96 pages.

IEEE 802.16™-2005 and IEEE Std 802.16™-2004/Cor1-2005 (Amendment and Corrigendum to IEEE Std 802.16-2004); IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society; 91 pages.

Differential Codebook MIMO Preceding Technique; Authors: Tetsushi Abe and Gerhard Bauch; Publication Date: IEEE GLOBECOM 2007 proceedings.

IEEE Std 802.11b-1999/Cor 1-2001 (Corrigendum to IEEE Std 802.11-1999); IEEE Standard for Information technology—Telecommunications and Information exchange; between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band-; Corrigendum 1; LAN/MAN Standards Committee of the IEEE Computer Society; Nov. 7, 2001; 23 pages.

PCT International Search Report for Application No. PCT/US08/56127; Sep. 8, 2009; 13 pages.

Choi et al., "Fast Algorithms for Antenna Selection in MIMO Systems"; Proc. IEEE Vehicular Technology Conference (VTC); Oct. 2003; 5 pages.

Gharavi-Alkhansari et al., "Fast Antenna Subset Selection in MIMO Systems"; IEEE Trans. Signal Processing; Feb. 2004; 9 pages.

Gore et al., "Selecting an Optimal Set of Transmit Antennas for a Low Rank Matrix Channel"; Proc. IEEE ICASSP; Jun. 2000; 4 pages.

Gorokhov, "Antenna Selection Algorithms for MEA Transmission Systems"; IEEE ICASSP; May 2002; 4 pages.

Heath et al., "Antenna Selection for Spatial Multiplexing Systems Based on Minimum Error Rate"; Proc. IEEE International Conference on Communications; Jun. 2001; 5 pages.

Molisch et al., "MIMO Systems with Antenna Selection—An Overview"; IEEE Microwave Magazine; Mar. 2004; 11 pages.

Proakis et al., "Algorithms for Statistical Signal Processing"; Prentice Hall; Table of Contents; 2002; 26 pages.

Zhang et al., "Fast MIMO Transmit Antenna Selection Algorithms: A Geometric Approach"; IEEE Communciation Letters; Nov. 2006; 3 pages.

IEEE Std 802.11g/D2.8, May 2002 (Supplement to ANSI/IEEE Std 802.11, 1999 Edition); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 53 pages.

* cited by examiner

TRANSMIT BEAMFORMING SYSTEMS AND METHODS

CROSS-REFERENCE TO RELATED APPLICATIONS

This application claims the benefit of U.S. Provisional Application No. 61/045,050, filed on Apr. 15, 2008. The disclosure of the above application is incorporated herein by reference in its entirety.

This application relates to U.S. application Ser. No. 12/059,846, filed on Mar. 31, 2008, and U.S. application Ser. No. 12/044,117, filed on Mar. 7, 2008. The disclosures of the above applications are incorporated herein by reference in their entirety.

FIELD

The present disclosure relates to wireless communication systems, and particularly to beamforming in wireless communication devices compliant with multiple communication standards.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

FIG. 1 illustrates a conventional wireless communication system 10 including a first wireless device 12 that communicates with a second wireless device 14 via a channel 16. The first wireless device 12 includes a transmitter 18 and a receiver 22. The transmitter 18 may transmit radio-frequency (RF) signals via antennas 20-1, 20-2, . . . , and 20-$n$ (collectively antennas 20). The receiver 22 may receive RF signals via the antennas 20. The second wireless device 14 includes a receiver 24 and a transmitter 28. The receiver 24 may receive RF signals via antennas 26-1, 26-2, . . . , and 26-$n$ (collectively antennas 26). The transmitter 28 may transmit RF signals via the antennas 26. The transmitter 18 may communicate with the receiver 24 via the antennas 20, 26. The transmitter 28 may also communicate with the receiver 22 via the antennas 20, 26. For example only, the first and second wireless devices 12, 14 may include wireless access points (e.g., a wireless router) and wireless adapters (e.g., a wireless network interface card).

The transmitter 18 may encode data streams for transmission via the antennas 20. The antennas 20 transmit signals based on the data streams. A signal transmitted based on a single data stream is referred to herein as a "single stream signal." When the transmitter 18 transmits a single stream signal, the transmitter 18 operates in a "single stream mode."

Additionally, the antennas 20 may transmit signals based on multiple data streams. For example, a first set of the antennas 20 may transmit a first single stream signal, and a second set of the antennas 20 may transmit a second single stream signal. Signals transmitted based on multiple data streams are referred to herein as "multi-stream signals." Transmitting multi-stream signals over the channel 16 may be referred to as "spatial multiplexing". When the transmitter 18 transmits multi-stream signals that correspond to multiple data streams, the transmitter 18 operates in a "multiple-input multiple-output (MIMO) mode."

The transmitter 18 may selectively operate in the single stream mode or the MIMO mode. When operating in the single stream mode, the transmitter 18 may comply with at least one of the Institute of Electrical and Electronics Engineers (IEEE) standards including IEEE 802.11a, IEEE 802.11b, and IEEE 802.11g, which are incorporated herein by reference. When operating in the MIMO mode, the transmitter 18 may comply with standards including The $3^{RD}$ generation partnership project (3GPP™), IEEE 802.16e, and IEEE P802.11n™/D3.00 (hereinafter "802.11n"), which are incorporated herein by reference.

SUMMARY

A system comprises a transmitting module, a mapping module, and an updating module. The transmitting module transmits a first set of data streams using N subcarriers when a wireless device operates in a first mode. The transmitting module transmits a second set of data streams using M subcarriers when the wireless device operates in a second mode. N and M are integers greater than or equal to 1. The mapping module maps the first set of data streams to a first set of antennas of the wireless device based on a first set of mapping values. The mapping module maps the second set of data streams to a second set of antennas of the wireless device based on a second set of mapping values. The updating module generates the second set of mapping values based on the first set of mapping values in response to the wireless device transitioning from the first mode to the second mode.

A method comprises transmitting a first set of data streams using N subcarriers when a wireless device operates in a first mode. The method further comprises transmitting a second set of data streams using M subcarriers when the wireless device operates in a second mode. N and M are integers greater than or equal to 1. The method further comprises mapping the first set of data streams to a first set of antennas of the wireless device based on a first set of mapping values. The method further comprises mapping the second set of data streams to a second set of antennas of the wireless device based on a second set of mapping values. Additionally, the method comprises generating the second set of mapping values based on the first set of mapping values in response to the wireless device transitioning from the first mode to the second mode.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

Like reference symbols in the various drawings indicate like elements.

DESCRIPTION

Figure 1:
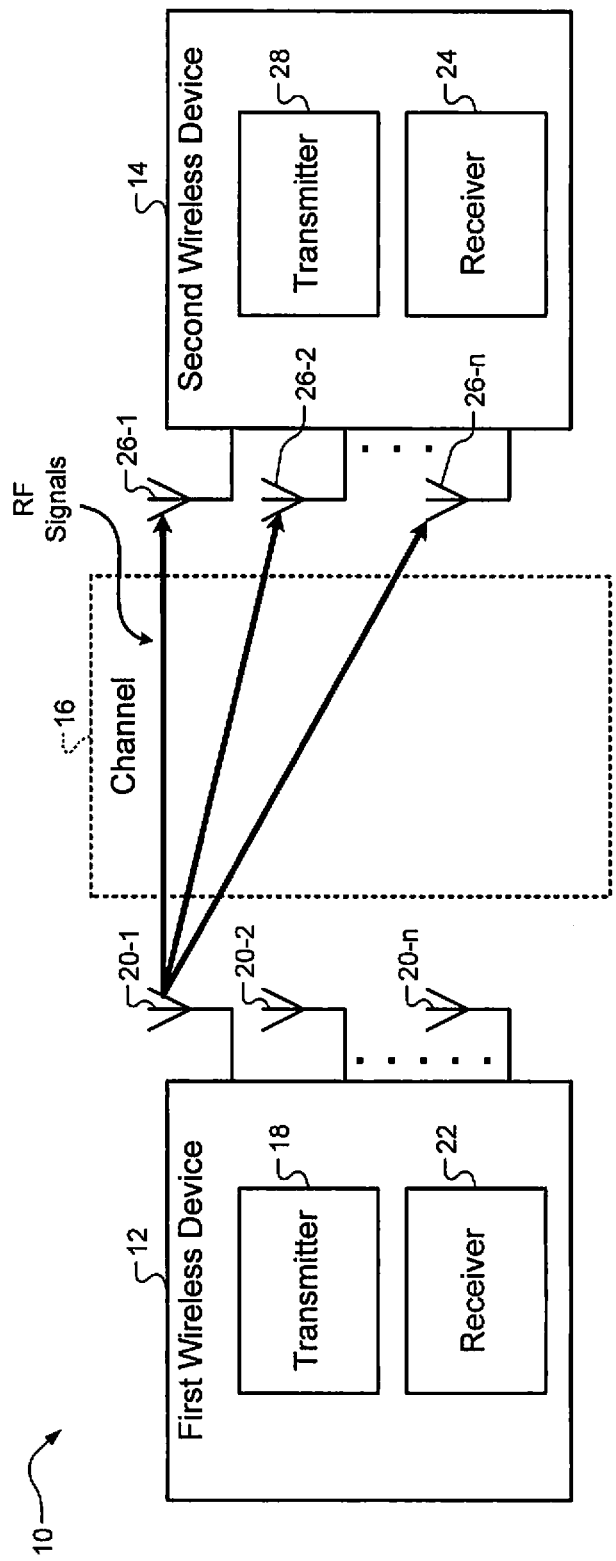
FIG. 1 is a functional block diagram of a conventional wireless communication system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A transmitter transmits signals to a receiver through a channel. The channel may include a wireless communication channel. Noise, such as electromagnetic interference, interchannel crosstalk, etc., may interfere with signals transmitted through the channel.

The transmitter may use a technique called beamforming to reduce the effects of noise on signals transmitted through the channel. Beamforming may increase a signal to noise ratio (SNR) of signals received at the receiver. Consequently, beamforming may allow the transmitter to increase data rates during transmission.

During beamforming, the transmitter may map data streams to antennas to change a spatial gain of transmitted signals. Mapping the data streams to the antennas to change the spatial gain of transmitted signals is referred to herein as "steering a signal." The transmitter may map a data stream to the antennas using complex weighting values. Each of the complex weighting values may include an amplitude portion and a phase shift portion. The complex weighting values used to map the data stream to the antennas may be included in a steering matrix. Accordingly, the transmitter may map the data stream to the antennas based on the steering matrix.

The transmitter may steer signals in the single stream mode. For example, the transmitter may steer the single stream signal using multiple antennas. Additionally, the transmitter may steer signals in the MIMO mode. For example, the transmitter may steer a first single stream signal using a first set of the antennas and may steer a second single stream signal using a second set of the antennas.

Received signals at the receiver may be mathematically expressed by the following equation:

$$y=Hx+N,$$

where y represents a received signal that is received at the receiver, x represents a transmitted signal that was transmitted via the antennas, H represents the channel through which the signal x was transmitted, and N represents additive noise.

When the transmitter uses beamforming, the transmitted signal x is weighted by a steering matrix V. The transmitted signal x may be mathematically expressed by the following equation:

$$x=VS,$$

where S represents one or more data streams to be mapped to the antennas, and V represents a steering matrix that modifies S to spatially map S onto the antennas. Accordingly, received signals in a wireless communication system that uses beamforming techniques may be mathematically expressed by the following equation:

$$y=HVS+N \qquad \text{(Eq. 1)}$$

The transmitter and the receiver may communicate using various modulation schemes. For example, the transmitter and the receiver may communicate using a single carrier modulation scheme. The single carrier modulation scheme may comply with the IEEE 802.11b standard. When the transmitter transmits signals using the single carrier modulation scheme, the transmitter operates in a "single carrier mode."

When the transmitter operates in the single carrier mode, the channel may be modeled as a multi-path channel having delay dispersive characteristics in a time domain. More specifically, a signal transmitted from the transmitter may travel along multiple paths before the signal reaches the receiver. The signal may travel along multiple paths due to deflections and reflections by objects in the channel. The receiver may receive multiple versions of the transmitted signal due to the multi-path channel. Multiple versions of the transmitted signal may interfere with each other causing inter-symbol interference (ISI).

When the transmitter operates in the single carrier mode, received signals in the wireless communication system may be described as a tapped delay line according to the following equation:

$$y(n) = \sum_{l=0}^{L-1} H(l)x(n-l) + N(n) \qquad \text{(Eq. 2)}$$

where y(n) represents the received signal at the receiver at time n. The received signal includes multiple signals x generated due to multi-path delay. H(l) represents each tap in the tapped delay line model of the channel. L may represent a number of transmitted signals. N represents noise. Thus, the received signal may include a current transmitted signal and previously transmitted signals. The previously transmitted signals may be present in the received signal due to multi-path delay and may result in ISI.

When the transmitter uses beamforming, the transmitted signal x is weighted by a steering matrix. The transmitted signal x at time n may be mathematically expressed by the following equation:

$$x(n) = \sum_{i=0}^{I-1} V(i)S(n-i), \qquad \text{(Eq. 3)}$$

where V(i) is a time domain steering matrix at a tap index i, S represents one or more data streams, and I is a total number of taps. In other words, V(i) may be applied over I time taps like a spatio-temporal filter.

Alternatively or additionally, the wireless communication system may use a multiple carrier modulation scheme. The multiple carrier modulation scheme may include orthogonal frequency-division multiplexing (OFDM). For example, an OFDM modulation scheme may comply with at least one of the IEEE 802.11a, IEEE 802.11g, and IEEE 802.11n standards. In OFDM, a wideband carrier signal is converted into a series of independent narrowband sub-carrier signals that are adjacent to each other in the frequency domain. When the transmitter transmits signals using the multiple carrier modulation scheme, the transmitter operates in an "OFDM mode."

When the transmitter operates in OFDM mode, Eq. 1 may apply to each subcarrier or group of adjacent subcarriers (hereinafter "subcarriers"). For example, when the transmitter uses k subcarriers in the OFDM mode, a received signal in the wireless communication system may be described by k equations (one equation for each of the k subcarriers), as follows:

$$y_1 = H_1 V_1 S_1 + N_1 \quad \text{(Eq. 4)}$$
$$\vdots$$
$$y_k = H_k V_k S_k + N_k$$

In Eq. 4, $y_k = H_k V_k S_k + N_k$ represents a received signal for the $k^{th}$ subcarrier. The transmitter may generate a steering matrix (e.g., $V_k$) for each of the subcarriers.

The transmitter may generate steering matrices $V(i)$ and $V_k$ based on channel state information (CSI). The transmitter may determine channel state information using an implicit approach or explicit approach. When using an implicit approach, a transmitter (a first wireless device) estimates channel state information from the transmitter to a receiver (a second wireless device) (i.e., forward channel) based on a sounding signal sent from the receiver to the transmitter. The transmitter may use the implicit approach assuming the channel is reciprocal. Alternatively, when using an explicit approach, the transmitter may send a sounding signal to the receiver. The receiver may estimate channel state information based on the sounding signal received from the transmitter. The receiver then transmits channel state information to the transmitter.

In the wireless communication system, a wireless device may operate in a frequency band using one of four modes: the single stream mode, the MIMO mode, the single carrier mode, and the OFDM mode. The wireless device may select one of the four modes depending on a data rate that can be supported under the channel conditions. When using one of the four modes, the wireless device may generate a steering matrix for the mode used. Occasionally, the wireless device may switch modes without switching the frequency band. For example, the wireless device may switch modes within the frequency band due to a change in channel conditions. Typically, the wireless device discards the steering matrix when transitioning from a first mode to a second mode. Consequently, the wireless device may transmit signals that are not steered when the wireless device (initially)_ enters the second mode. Transmitting signals that are not steered may degrade performance of the wireless communication system.

The present disclosure relates to a beamforming system that generates a steering matrix for the second mode based on a steering matrix used in the first mode when the wireless device switches from the first mode to the second mode without switching the frequency band. For example, when the channel conditions do not change drastically, the wireless device may not discard the steering matrix from the first mode when the wireless device transitions from the first mode to the second mode. Instead, the wireless device may use the steering matrix from the first mode to generate the steering matrix for the second mode. Accordingly, the wireless device may transmit steered signals upon entering the second mode. Consequently, the performance of the wireless communication system may not degrade when the wireless device switches modes.

When the wireless device operates in the single stream mode, the wireless device may comply with at least one of the IEEE standards including IEEE 802.11a, IEEE 802.11b, and IEEE 802.11g, which are incorporated herein by reference. When operating in the MIMO mode, the wireless device may comply with comply with IEEE 802.11n™/D3.00 (hereinafter "802.11n"), which is incorporated herein by reference. When the wireless device operates in the single carrier mode, the wireless device may comply with the IEEE 802.11b standard. When the wireless device operates in the OFDM mode, the wireless device may comply with at least one of the IEEE 802.11a, IEEE 802.11g, and IEEE 802.11n standards.

Figure 2:
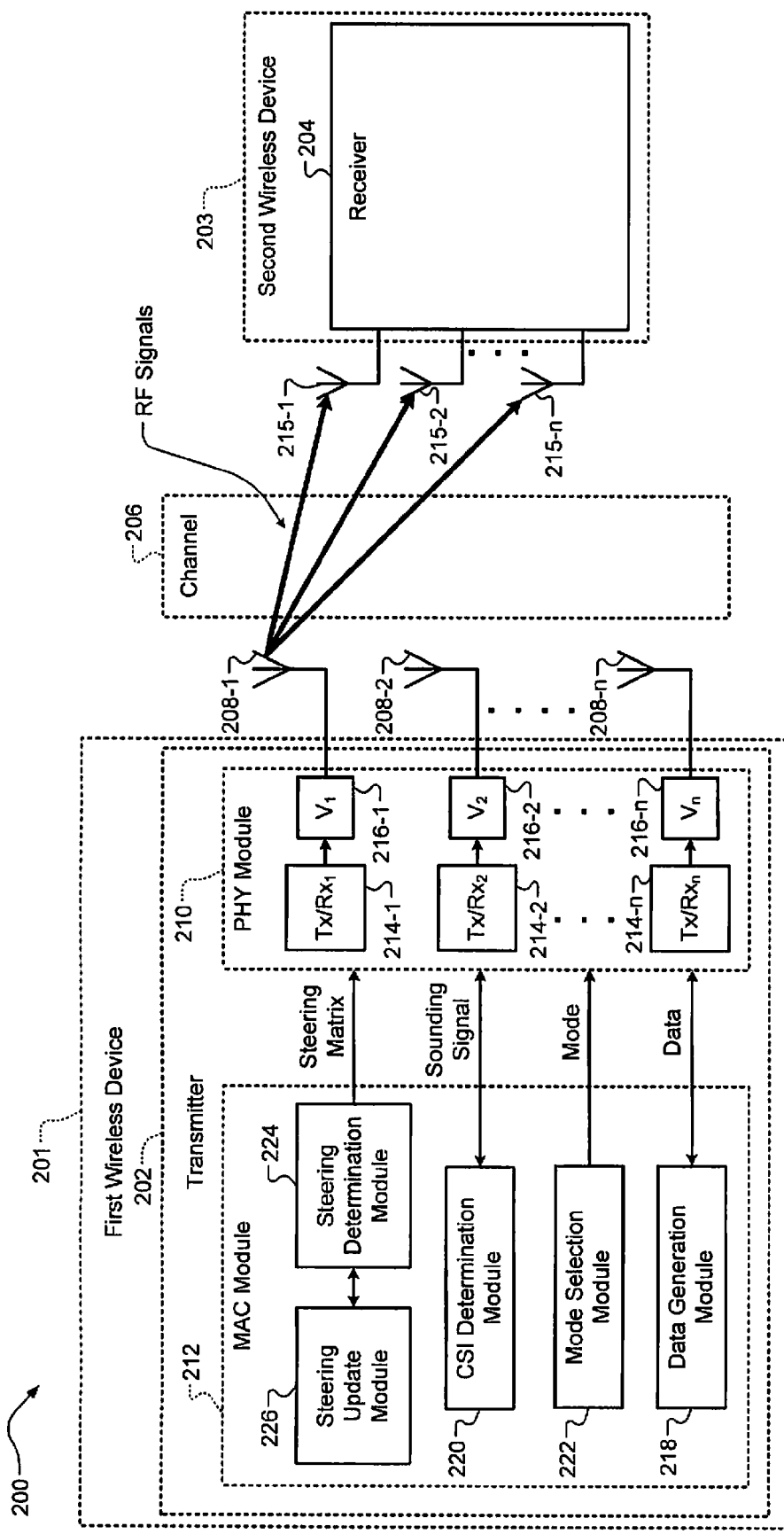
FIG. 2 is a functional block diagram of a beamforming system including a transmitter that updates steering matrices.
Figure 3:
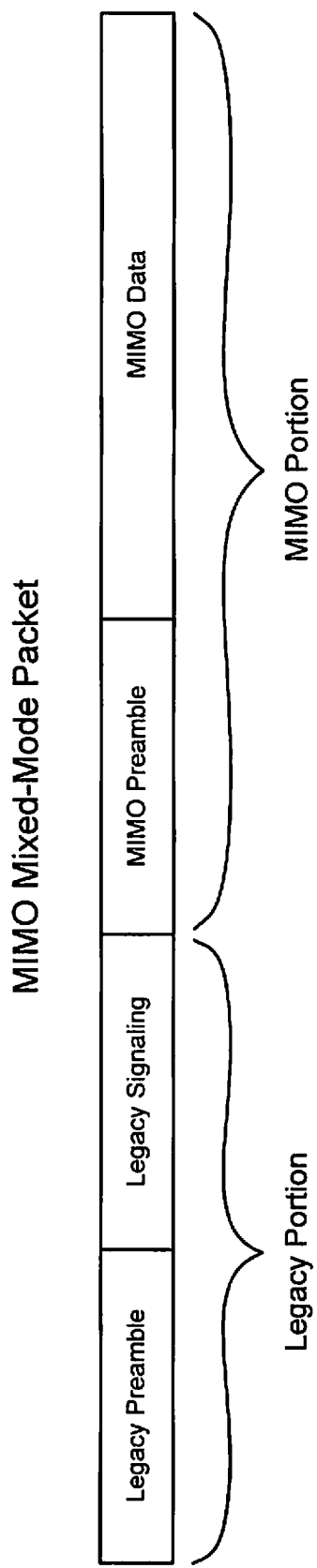
FIG. 3 depicts a format of a multiple-input multiple-output (MIMO) mixed-mode packet.

The beamforming system is described below in detail. The description is organized as follows. FIG. 2 shows a beamforming system that includes a first wireless device that may steer signals to a second wireless device. The first wireless device may update steering matrices when transitioning between modes. FIG. 3 shows a mixed mode packet that includes a legacy portion and a MIMO portion. The first wireless device may steer the legacy portion based on a steering matrix used to steer the MIMO portion. FIGS. 4-8 show methods for updating steering matrices when the first wireless device transitions between modes.

Referring now to FIG. 2, a beamforming system 200 comprises a first wireless device 201 and a second wireless device 203. The first wireless device 201 comprises a transmitter 202 that communicates with a receiver 204 of the second wireless device 203. The transmitter 202 may communicate with the receiver 204 through a channel 206. The transmitter 202 comprises antennas 208-1, 208-2, . . . , and 208-n (collectively transmit antennas 208). The transmitter 202 comprises a physical layer (PHY) module 210 and a media access control (MAC) module 212. The PHY module 210 includes transceiver modules 214-1, 214-2, . . . , and 214-n (collectively transceiver modules 214). The transceiver modules 214-1, 214-2, . . . , and 214-n may be denoted by $Tx/Rx_1$, $Tx/Rx_2$, . . . , and $Tx/Rx_n$, respectively, as shown. The transceiver modules 214 transmit and receive radio-frequency (RF) signals via the transmit antennas 208. The receiver 204 comprises antennas 215-1, 215-2, . . . , and 215-n (collectively receive antennas 215) that may receive RF signals transmitted from the transmitter 202.

The PHY module 210 includes mapping modules 216-1, 216-2, . . . , and 216-n (collectively mapping modules 216). The mapping modules 216-1, 216-2, . . . , and 216-n may be denoted by $V_1$, $V_2$, . . . , and $V_n$, respectively, as shown. The mapping modules 216 may adjust signals received from respective transceiver modules 214 to change the spatial gain of transmitted signals. The mapping modules 216 may also adjust signals received via the transmit antennas 208. The mapping modules 216 may adjust signals based on complex weighting values. Each of the complex weighting values may include an amplitude portion and a phase shift portion. However, other weighting value configurations may be possible. The complex weighting values is referred to herein also as "mapping values."

The MAC module 212 comprises a data generation module 218 and a channel state information (CSI) determination module 220. The data generation module 218 outputs data to the PHY module 210 for transmission via the transmit antennas 208. The CSI determination module 220 determines channel state information. The CSI determination module 220 may determine channel state information using sounding signals. For example, when the channel 206 is reciprocal, the CSI determination module 220 may estimate a forward channel based on a sounding signal sent from the receiver 204 to the transmitter 202. Alternatively, the transmitter 202 may send a sounding signal to the receiver 204. The receiver 204 may estimate the forward channel based on the sounding signal received from the transmitter 202 and then transmit channel state information back to the transmitter 202.

The data generation module 218 may output one or more data streams to the PHY module 210 for transmission via the transmit antennas 208. The transmit antennas 208 transmit a single stream signal when the transmitter 202 operates in the single stream mode. The transmit antennas 208 may transmit multi-stream signals when the transmitter 202 operates in the MIMO mode.

The transmitter 202 and the receiver 204 may communicate using various modulation schemes. For example, the transmitter 202 and the receiver 204 may communicate using a single carrier modulation scheme. When the transmitter 202 transmits signals using a single carrier modulation scheme, the transmitter 202 operates in the single carrier mode.

Alternatively or additionally, the transmitter 202 and the receiver 204 may communicate using a multiple carrier modulation scheme. The multiple carrier modulation scheme may include OFDM. When the transmitter 202 transmits signals using OFDM, the transmitter 202 operates in the OFDM mode.

The MAC module 212 further comprises a mode selection module 222 that selects an operating mode of the transmitter 202. For example, the mode selection module 222 may instruct the PHY module 210 to transmit in at least one of the single stream mode, the MIMO mode, the single carrier mode, and the OFDM mode. Accordingly, the mode selection module 222 may instruct the PHY module 210 to modulate one or more single stream signals using a single carrier. The mode selection module 222 may also instruct the PHY module 210 to modulate one or more single stream signals using OFDM.

The mode selection module 222 may instruct the PHY module 210 to switch modes based on channel state information. For example, the mode selection module 222 may instruct the PHY module 210 to switch modes when channel state information changes due to a change in distance between the transmitter 202 and receiver 404. For example, when the transmitter 202 is closer to the receiver 204, the data rate between the transmitter 202 and the receiver 204 can be higher due to increased channel strength. Accordingly, the transmitter 202 may switch to a mode that supports a higher data rate. Conversely, when the transmitter 202 moves farther from the receiver 204, the channel strength may decrease, and the transmitter 202 may decrease data rate. Accordingly, the transmitter 202 may switch to a mode that supports a lower data rate.

The MAC module 212 further comprises a steering determination module 224 and a steering update module 226 that implement beamforming. The steering determination module 224 may generate the mapping values that are used to map one or more data streams to the transmit antennas 208. The steering determination module 224 may determine the mapping values based on channel state information. The mapping values may include complex values that include an amplitude portion and a phase shift portion.

The mapping modules 216 may adjust the spatial gain of the transmitted signal based on the mapping values. The mapping values may be represented by a steering matrix. The steering determination module 224 may output the steering matrix to the PHY module 210 to map one or more data streams to the transmit antennas 208. Accordingly, the transmitter 202 may map a data stream to the transmit antennas 208 based on the steering matrix.

The steering determination module 224 may generate the steering matrix based on a singular value decomposition (SVD) approach or based on alternative algorithms. The columns of the steering matrix may each map a single stream signal to a set of the transmit antennas 208. The columns may be selected to increase a receive SNR across one or more single stream signals.

A steering matrix used in the single stream mode is referred to herein as a "single stream steering matrix." A steering matrix used in the MIMO mode is referred to herein as a "MIMO steering matrix." A steering matrix used in the single carrier mode is referred to herein as a "single carrier steering matrix." A steering matrix used in the OFDM mode is referred to herein as an "OFDM steering matrix."

The steering update module 226 updates the steering matrix when the transmitter 202 transitions between modes. For example, the steering update module 226 may update the steering matrix when the transmitter 202 transitions from the single stream mode to the MIMO mode, and vice versa. The steering update module 226 may also update the steering matrix when the transmitter 202 transitions from the single carrier mode to the OFDM mode, and vice versa.

Signals received at the receiver 204 may be mathematically expressed by the following equation:

$$y = HVS + N, \quad (Eq. 1)$$

where the transmitter 202 may map one or more data streams S to the transmit antennas 208 based on a steering matrix V. The one or more data streams S may be represented by a single column matrix including D rows, where each row represents a single data stream. Accordingly, the one or more data streams S may be mathematically represented by the following equation:

$$S = \begin{bmatrix} S_1 \\ \vdots \\ S_D \end{bmatrix}.$$

The steering matrix V may include T rows and D columns, where T is a number of the transmit antennas 208 onto which a single data stream is mapped. Each of the D columns may correspond to mapping of a different single stream signal. The steering matrix V may be mathematically represented by the following equation:

$$V = \begin{bmatrix} V_{11} & \cdots & V_{1D} \\ \vdots & \ddots & \vdots \\ V_{T1} & \cdots & V_{TD} \end{bmatrix}.$$

The received signal y may be represented by a single column matrix including R rows, where R is a number of the receive antennas 215. Accordingly, the received signal y may be mathematically represented by the following equation:

$$y = \begin{bmatrix} y_1 \\ \vdots \\ y_R \end{bmatrix}.$$

The channel H may be represented as an R×T matrix that modifies the transmitted signal x (i.e., VS). The channel H may be mathematically represented by the following equation:

$$H = \begin{bmatrix} H_{11} & \cdots & H_{1T} \\ \vdots & \ddots & \vdots \\ H_{R1} & \cdots & H_{RT} \end{bmatrix}.$$

Noise N received by the receive antennas 215 may be represented by a single column matrix that includes R rows. Accordingly, the noise N may be mathematically represented by the following equation:

$$N = \begin{bmatrix} N_1 \\ \vdots \\ N_R \end{bmatrix},$$

Signals received at the receiver 204 may be mathematically expressed by the following equation when the transmitter 202 operates in the single stream mode:

$$\begin{bmatrix} y_1 \\ \vdots \\ y_R \end{bmatrix} = \begin{bmatrix} H_{11} & \cdots & H_{1T} \\ \vdots & \ddots & \vdots \\ H_{R1} & \cdots & H_{RT} \end{bmatrix} \begin{bmatrix} V_1 \\ \vdots \\ V_T \end{bmatrix} S + \begin{bmatrix} N_1 \\ \vdots \\ N_R \end{bmatrix}, \quad \text{(Eq. 5)}$$

where S is a single element matrix that represents a single data stream. The steering matrix V may be a single column matrix that includes T elements when the transmitter 202 operates in the single stream mode. In one implementation, the steering matrix V may map a single data stream S onto T transmit antennas 208.

Signals received at the receiver 204 may be mathematically expressed by the following equation when the transmitter 202 operates in the MIMO mode:

$$\begin{bmatrix} y_1 \\ \vdots \\ y_R \end{bmatrix} = \begin{bmatrix} H_{11} & \cdots & H_{1T} \\ \vdots & \ddots & \vdots \\ H_{R1} & \cdots & H_{RT} \end{bmatrix} \begin{bmatrix} V_{11} & \cdots & V_{1D} \\ \vdots & \ddots & \vdots \\ V_{T1} & \cdots & V_{TD} \end{bmatrix} \begin{bmatrix} S_1 \\ \vdots \\ S_D \end{bmatrix} + \begin{bmatrix} N_1 \\ \vdots \\ N_R \end{bmatrix}, \quad \text{(Eq. 6)}$$

where S is represented by single column matrix including D elements corresponding to D data streams. The steering matrix V may be represented as a T×D matrix when the transmitter 202 operates in the MIMO mode. In one implementation, the steering matrix V maps D data streams onto T transmit antennas when the transmitter operates in the MIMO mode. For example, a first set of transmit antennas 208 may map a first data stream, and a second set of transmit antennas 208 may map a second data stream.

When the transmitter 202 operates in the single carrier mode, the transmitter 202 may map a data stream to transmit antennas 208 using a single carrier steering matrix. The mapping of a data stream when the transmitter 202 operates in the single carrier mode may be mathematically represented by the following equation:

$$x(n) = \sum_{i=0}^{I-1} V(i) S(n-i), \quad \text{(Eq. 3)}$$

where x(n) represents the transmitted signal at time n, and V(i) represents the single carrier steering matrix in the time domain at a tap index i. S represents one or more data streams and I denotes a total number of taps in the tapped delay line model.

Signals received at the receiver 204 may be mathematically expressed by the following equation when the transmitter 202 operates in the OFDM mode:

$$\begin{aligned} y_1 &= H_1 V_1 S_1 + N_1 \\ &\vdots \\ y_k &= H_k V_k S_k + N_k \end{aligned} \quad \text{(Eq. 4)}$$

where the transmitter 202 operates using k subcarriers. $y_k$ denotes signals received at the receiver 204 for the $k^{th}$ subcarrier. The transmitter 202 may generate the OFDM steering matrix $V_k$ for each of the k subcarriers.

The beamforming system 200 generates the steering matrix for the second mode by updating the steering matrix for the first mode when the transmitter 202 transitions from the first mode to the second mode. More specifically, the steering update module 226 may update the steering matrix when the transmitter 202 transitions from the single stream mode to the MIMO mode, and vice versa. The steering update module 226 may also update the steering matrix when the transmitter 202 transitions from the single carrier mode to the OFDM mode, and vice versa. The transitions are discussed below in turn.

When the transmitter 202 transitions from the MIMO mode to the single stream mode, the steering update module 226 generates the single stream steering matrix based on the MIMO steering matrix. When in the MIMO mode, the transmitter 202 may transmit a single stream signal using spatial diversity according to Eq. 5 or may transmit a multi-stream signal using spatial multiplexing according to Eq. 6. When the transmitter 202 operates in the single stream mode, the transmitter 202 may transmit a single stream signal according to Eq. 5.

When the transmitter 202 transitions from the MIMO mode to the single stream mode, the steering update module 226 may generate the single stream steering matrix based on a column of the MIMO steering matrix. For example, the steering update module 226 may generate the single stream steering matrix by using the first column of the MIMO steering matrix of as follows:

$$\begin{bmatrix} V_{11} & \cdots & V_{1D} \\ \vdots & \ddots & \vdots \\ V_{T1} & \cdots & V_{TD} \end{bmatrix} \rightarrow \begin{bmatrix} V_{11} \\ \vdots \\ V_{T1} \end{bmatrix}$$
$$\text{MIMO} \quad \quad \text{Single Stream}$$

The steering update module 226 may generate the single stream steering matrix based on an SNR associated with each column. For example, the steering update module 226 may generate the single stream steering matrix by using the column of the MIMO steering matrix that maximizes the SNR at the receiver 204.

When the transmitter 202 transitions from the MIMO mode to the single stream mode, and when both the MIMO mode and the single stream mode use OFDM, subcarriers used in the single stream mode may occupy a subset of the subcarriers used in the MIMO mode. Subcarriers that are common to both the single stream mode and the MIMO mode is referred to herein as "overlapping subcarriers." The steering update module 226 may generate the single stream steering matrices from the MIMO steering matrices that correspond to the overlapping subcarriers. When the subcarriers do not overlap exactly, the steering update module 226 may generate the single stream steering matrices from the MIMO steering matrices that correspond to the subcarriers that nearly overlap.

Referring now to FIG. 3, the transmitter 202 may transmit a mixed mode packet (e.g., when complying with IEEE 802.11n). The mixed mode packet may include a single stream legacy portion and a multi-stream MIMO portion. The legacy portion of the mixed mode packet may be used for carrier sensing, timing, and frequency synchronization at the receiver 204. The transmitter 202 may transmit the legacy portion to enable legacy receivers to determine a length of the MIMO portion so that the legacy receives can stop transmission during a period when the MIMO portion is transmitted (e.g., in carrier sense multiple access (CSMA) protocols).

Typically, the legacy portion of the mixed-mode packet is not steered, and the MIMO portion may be steered. The transmitter 202 may steer the legacy portion based on the MIMO steering matrix that is used to steer the MIMO portion. Steering the legacy portion based on the MIMO steering matrix may increase signal strength at the receiver 204, so that the quality of carrier sensing and synchronization is improved. The steering update module 226 may generate a single stream steering matrix to steer the legacy portion based on the MIMO steering matrix used to steer the MIMO portion. For example, the steering update module 226 may use a single column of the MIMO steering matrix to steer the legacy single stream portion. Steering the legacy portion may improve reception of the legacy portion at the receiver 204.

Referring back to FIG. 2, when the transmitter 202 transitions from the single stream mode to the MIMO mode, the steering update module 226 may generate the MIMO steering matrix based on the single stream steering matrix. The transmitter 202 may transmit in the single stream mode using a single column matrix according to Eq. 5. When the transmitter 202 transmits a single stream in the MIMO mode, the steering update module 226 may use the single column of the single stream steering matrix to generate the MIMO steering matrix. For example, the MIMO steering matrix may be set equal to the single stream matrix when the transmitter 202 transmits the single stream signal in the MIMO mode.

When the transmitter 202 transmits multiple streams in the MIMO mode, the steering update module 226 may generate the MIMO steering matrix based on the single stream steering matrix. For example, the steering update module 226 may generate the MIMO steering matrix by using the single stream steering matrix as the first column of the MIMO steering matrix. The steering update module 226 may then generate additional columns of the MIMO steering matrix by generating columns that are orthogonal to the first column.

When the transmitter 202 transitions from the single stream mode to the MIMO mode, and when both single stream and MIMO modes use OFDM, the single stream mode and the MIMO mode may include overlapping subcarriers. The steering update module 226 may generate the MIMO steering matrices from the single stream steering matrices that correspond to the overlapping subcarriers. When the subcarriers do not operlap exactly, the steering update module 226 may generate the MIMO steering matrices from the single stream steering matrices that correspond to the subcarriers that nearly overlap.

When the transmitter 202 transitions from the OFDM mode to the single carrier mode, the steering update module 226 may generate the single carrier steering matrix based on the OFDM steering matrix. The transmitter 202 may use k subcarriers in the OFDM mode. When the transmitter 202 uses k subcarriers in OFDM mode, Eq. 4 may include an OFDM steering matrix for each of the k subcarriers. The OFDM steering matrices corresponding to the k subcarriers may be denoted as matrices $V_1 \rightarrow V_k$. When the transmitter 202 operates in the single carrier mode, Eq. 3 may include a single carrier steering matrix for each of the I taps. The single carrier steering matrices corresponding to the I taps may be denoted as matrices $V(0) \rightarrow V(I-1)$.

When the transmitter 202 transitions from the OFDM mode to the single carrier mode, the steering update module 226 may generate one or more single carrier matrices based on the OFDM steering matrices. The steering update module 226 may generate multiple single carrier steering matrices $V(0) \rightarrow V(I-1)$ based on the matrices $V_1 \rightarrow V_k$. For example, the steering update module 226 may generate the matrices $V(0) \rightarrow V(I-1)$ based on an inverse discrete Fourier transform (IDFT) of the matrices $V_1 \rightarrow V_k$.

When the number of taps I is not long enough to match the IDFT of the matrices $V_1 \rightarrow V_k$, the steering update module 226 may use an approximation algorithm to generate the matrices $V(0) \rightarrow V(I-1)$ For example, the steering update module 226 may use a least mean square algorithm to approximately generate the matrices $V(0) \rightarrow V(I-1)$.

The transmitter 202 may switch from transmitting multi-stream signals in the OFDM mode to transmitting a single stream signal in the single carrier mode. When the OFDM mode includes multiple streams, the OFDM steering matrices $V_1 \rightarrow V_k$ may include multiple columns. The steering update module 226 may generate the single carrier steering matrices based on selected columns of the matrices $V_1 \rightarrow V_k$ when the OFDM mode includes multi-stream signals and when the single carrier mode includes a single stream signal. For example, the steering update module 226 may generate the single carrier steering matrices $V(0) \rightarrow V(I-1)$ based on one column from each of the matrices $V_1 \rightarrow V_k$.

When the CSI determination module 220 determines channel state information matrices $H_1 \rightarrow H_k$ in the OFDM mode before switching to the single carrier mode, the steering update module 226 may generate the single carrier steering matrices $V(0) \rightarrow V(I-1)$ based on the matrices $H_1 \rightarrow H_k$. For example, the steering update module 226 may determine the time domain channel matrices $H(0) \rightarrow H(L-1)$ of Eq. 2 by IDFT of matrices $H_1 \rightarrow H_k$. The steering update module 226 may then determine the matrices $V(0) \rightarrow V(I-1)$ based on the matrices $H(0) \rightarrow H(L-1)$ using time domain beamforming approaches.

For I=1, the steering update module 226 may generate a single carrier steering matrix $V(0)$ based on the matrices $V_1 \rightarrow V_k$ when the transmitter 202 transitions from the OFDM mode to the single carrier mode. The steering update module 226 may generate the single carrier steering matrix $V(0)$ based on an IDFT of the matrices $V_1 \rightarrow V_k$. When the transmitter 202 transmits multi-stream signals in the OFDM mode (i.e., the matrices $V_1 \rightarrow V_k$ each includes multiple columns) and transmits a single stream signal in single carrier mode, then the single carrier steering matrix $V(0)$ may be determined based on an IDFT of selected columns of the matrices $V_1 \rightarrow V_k$.

When the CSI determination module 220 determines channel state information matrices $H_1 \rightarrow H_k$ in the OFDM mode before switching from the OFDM mode to the single carrier mode, the steering update module 226 may determine the single carrier steering matrix $V(0)$ based on the matrices $H_1 \rightarrow H_k$. For example, the steering update module 226 may determine the matrices $H(0) \rightarrow H(L-1)$ by IDFT of the matrices $H_1 \rightarrow H_k$, and then generate the single carrier steering matrix $V(0)$ based on the matrices $H(0) \rightarrow H(L-1)$ by applying time domain beamforming approaches. The steering update module 226 may generate the single carrier steering matrix $V(0)$ by using the strongest tap among the matrices $H(0) \rightarrow H(L-1)$.

The transmitter 202 may apply cyclic delay diversity (CDD) to gain frequency diversity. Cyclic delay diversity may increase the equivalent time-domain channel delay-dispersion, resulting in longer steering matrix taps (I) to steer in the single stream mode. Accordingly, the transmitter 202 may disable cyclic delay diversity when steering in the OFDM mode to increase performance of the beamforming system 200.

When the transmitter 202 transitions from the single carrier mode to the OFDM mode, the steering update module 226 may determine the OFDM steering matrices based on one or more single carrier steering matrices. The steering update module 226 may generate the OFDM steering matrices $V_1 \rightarrow V_k$ based on the single carrier steering matrices $V(0) \rightarrow V(I-1)$. For example, the steering update module 226 may generate the OFDM steering matrices $V_1 \rightarrow V_k$ based on a discrete Fourier transform (DFT) of the single carrier steering matrices $V(0) \rightarrow V(I-1)$.

When I=1, the steering update module 226 may generate the OFDM steering matrices $V_1 \rightarrow V_k$ based on the single carrier steering matrix $V(0)$. For example, the steering update module 226 may generate the OFDM steering matrices $V_1 \rightarrow V_k$ by determining a DFT of the single carrier steering matrix $V(0)$. The steering update module 226 may then apply the DFT of the single carrier steering matrix $V(0)$ directly as the OFDM steering matrices $V_1 + V_k$ for each of the k subcarriers. The transmitter 202 may disable CDD to increase performance of the beamforming system 200 when steering in the OFDM mode.

Figure 4:
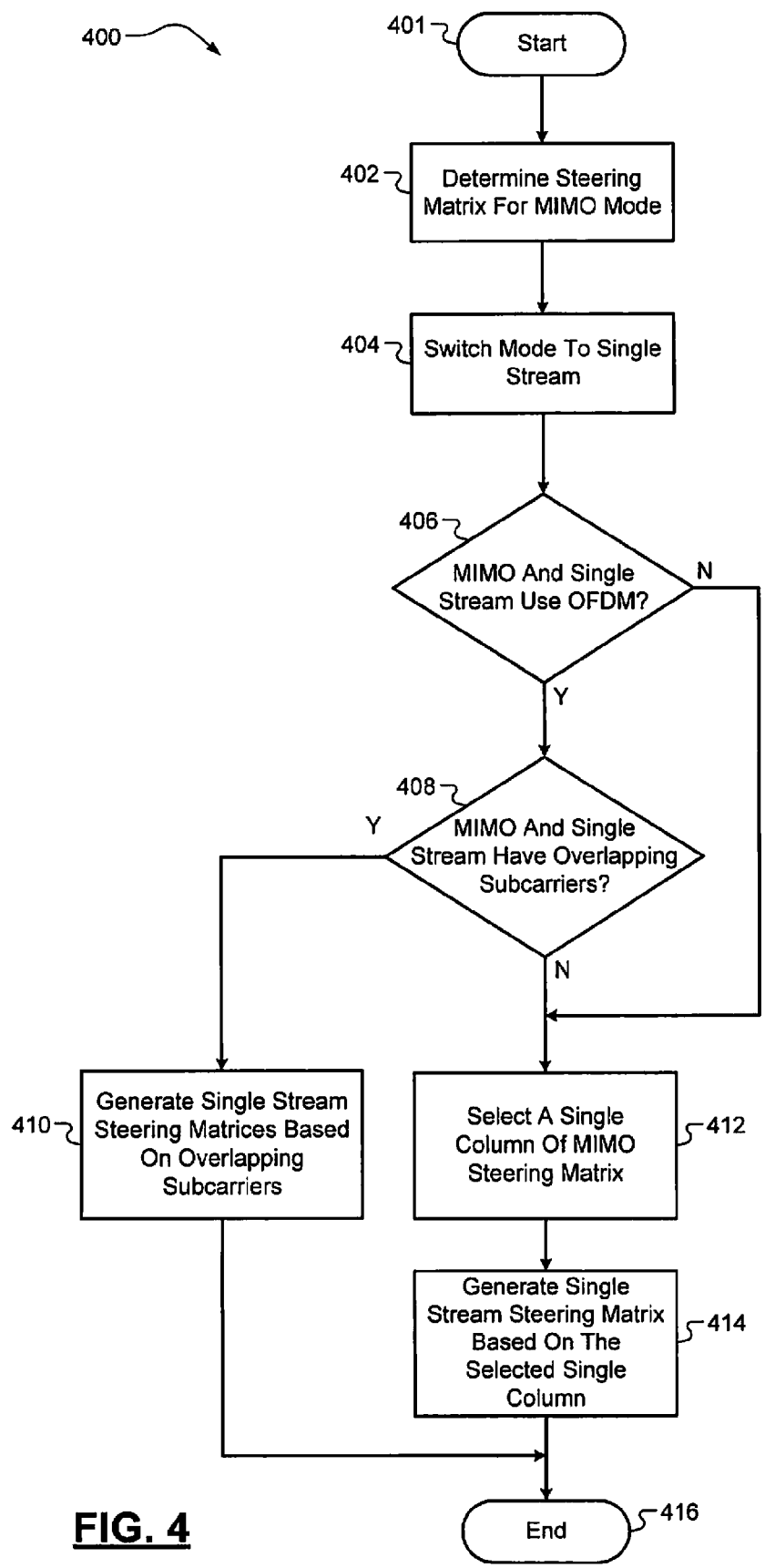
FIG. 4 illustrates a method for generating a single stream steering matrix when a transmitter transitions from a MIMO mode to a single stream mode.

Referring now to FIG. 4, a method 400 for generating a single stream steering matrix when a transmitter transitions from the MIMO mode to the single stream mode begins in step 401. In step 402, the steering determination module 224 determines the MIMO steering matrix. In step 404, the transmitter 202 transitions from the MIMO mode to the single stream mode.

In step 406, the transmitter 202 determines whether the MIMO mode and the single stream mode modulate transmissions use OFDM. If the result of step 406 is true, the method 400 continues with step 408. If the result of step 406 is false, the method 400 continues with step 412.

In step 408, the transmitter 202 determines whether the MIMO mode and the single stream mode include overlapping subcarriers. If the result of step 408 is true, the method 400 continues with step 410. If the result of step 408 is false, the method 400 continues with step 412.

In step 410, the steering update module 226 generates the single stream steering matrices based on the overlapping subcarriers of the MIMO transmission. In step 412, the steering update module 226 selects a single column of the MIMO steering matrix. In step 414, the steering update module 226 generates the single stream steering matrix based on the selected column of the MIMO steering matrix. The method 400 ends in step 416.

Figure 5:
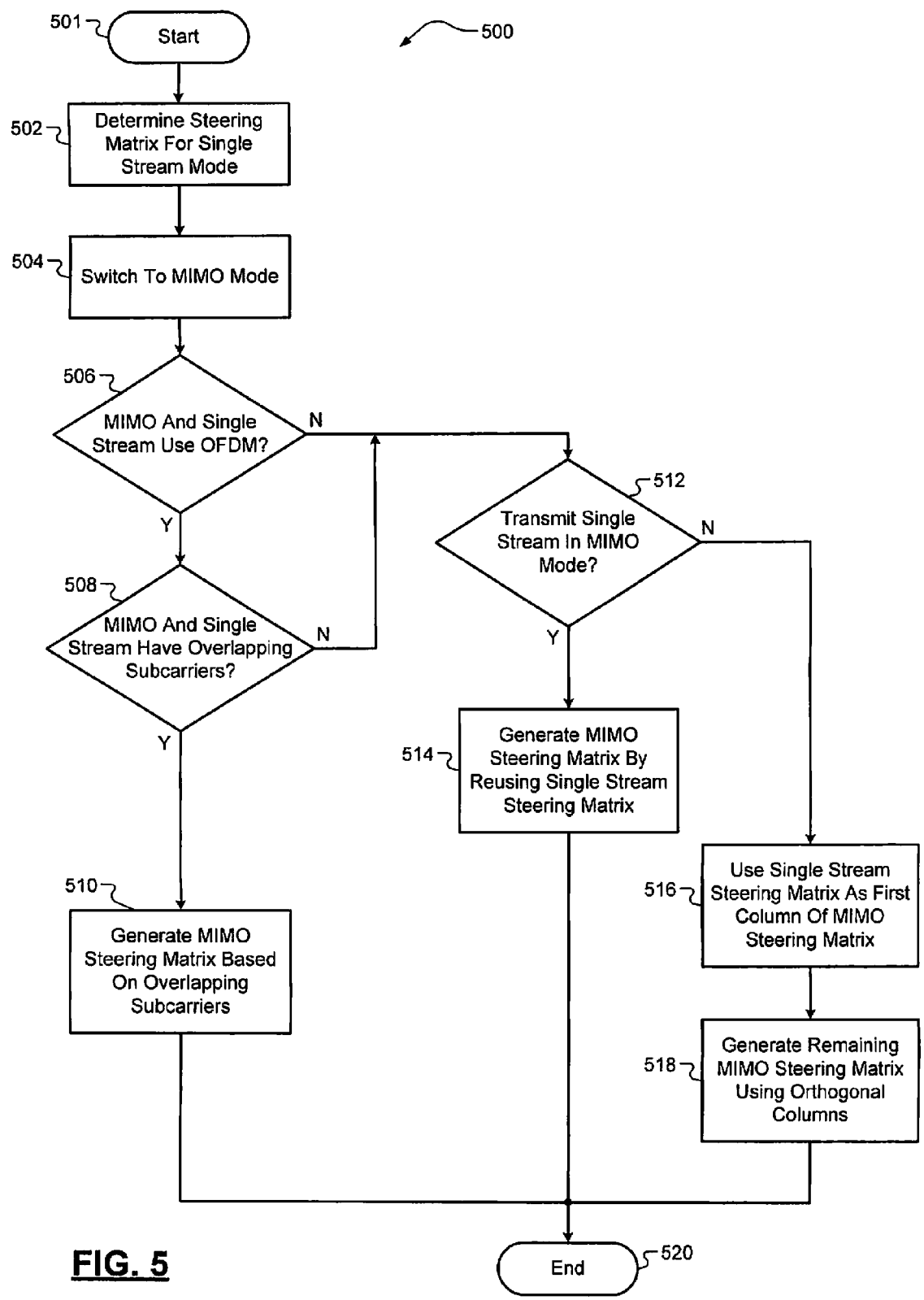
FIG. 5 illustrates a method for generating a MIMO steering matrix when the transmitter transitions from the single stream mode to the MIMO mode.

Referring now to FIG. 5, a method 500 for generating a MIMO steering matrix when a transmitter transitions from the single stream mode to the MIMO mode begins in step 501. In step 502, the steering determination module 224 determines the single stream steering matrix in the single stream mode. In step 504, the transmitter 202 transitions from the single stream mode to the MIMO mode.

In step 506, the transmitter 202 determines whether the MIMO mode and the single stream mode use OFDM. If the result of step 506 is true, the method 500 continues with step 508. If the result of step 506 is false, the method 500 continues with step 512.

In step 508, the transmitter 202 determines whether the MIMO mode and the single stream mode include overlapping subcarriers. If the result of step 508 is true, the method 500 continues with step 510. If the result of step 508 is false, the method 500 continues with step 512.

In step 510, the steering update module 226 generates the MIMO steering matrices based on the overlapping subcarriers of the single stream transmission. In step 512, the transmitter 202 determines whether to transmit a single stream signal when operating in the MIMO mode. If the result of step 512 is true, the method 500 continues with step 514. If the result of step 512 is false, the method 500 continues with step 516.

In step 514, the steering update module 226 generates the MIMO steering matrix by reusing the single stream steering matrix. In step 516, the steering update module 226 uses the single stream steering matrix as the first column of the MIMO steering matrix. In step 518, the steering update module 226 generates the remaining columns of the MIMO steering matrix by generating columns that are orthogonal to the first column of the MIMO steering matrix. The method 500 ends in step 520.

Figure 6:
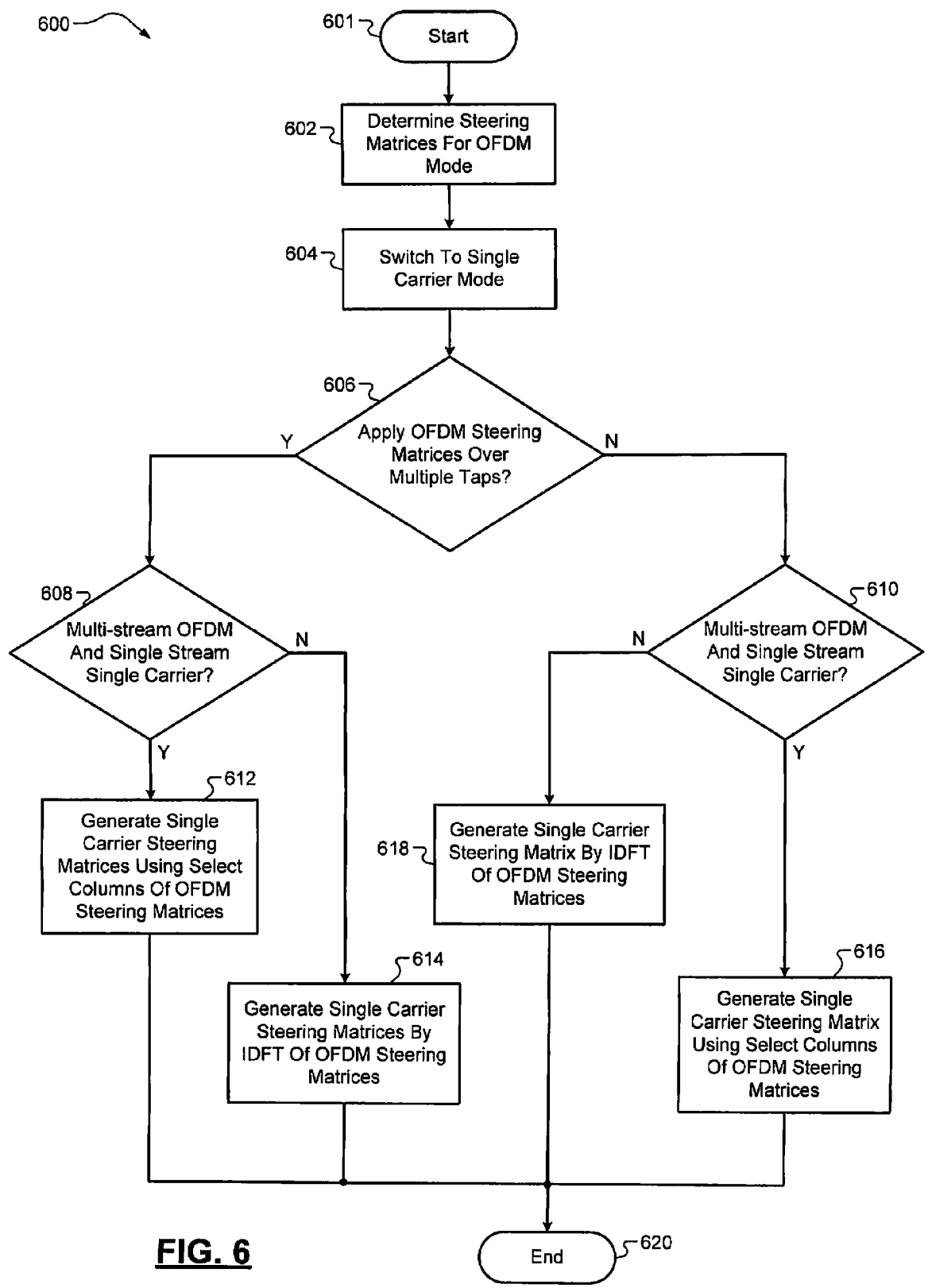
FIG. 6 illustrates a method for generating a single carrier steering matrix when the transmitter transitions from an OFDM mode to a single carrier mode.

Referring now to FIG. 6, a method 600 for generating a single carrier steering matrix when a transmitter transitions from the OFDM mode to the single carrier mode begins in step 601. In step 602, the steering determination module 224 determines OFDM steering matrices. In step 604, the transmitter 202 transitions from the OFDM mode to the single carrier mode.

In step 606, the transmitter 202 determines whether to apply the OFDM steering matrices over multiple time taps. If the result of step 606 is true, the method 600 continues with step 608. If the result of step 606 is false, the method 600 continues with step 610.

In step 608, the transmitter 202 determines whether to transmit single stream signals in the single carrier mode after the transmitter 202 transmitted multi-stream signals in the OFDM mode. If the result of step 608 is true, the method 600 continues with step 612. If the result of step 608 is false, the method 600 continues with step 614.

In step 612, the steering update module 226 generates the single carrier steering matrices by IDFT using select columns of the OFDM steering matrices. In step 614, the steering update module 226 generates the single carrier steering matrices by IDFT of the OFDM steering matrices.

In step 610, the transmitter 202 determines whether to transmit a single stream signal in the single carrier mode after the transmitter 202 transmitted multi-stream signals in the OFDM mode. If the result of step 610 is true, the method 600 continues with step 616. If the result of step 610 is false, the method 600 continues with step 618.

In step 616, the steering update module 226 generates the single carrier steering matrix by IDFT using select columns of the OFDM steering matrices. In step 618, the steering update module 226 generates the single carrier steering matrix by IDFT of the OFDM steering matrices. The method 600 ends in step 620.

Figure 7:
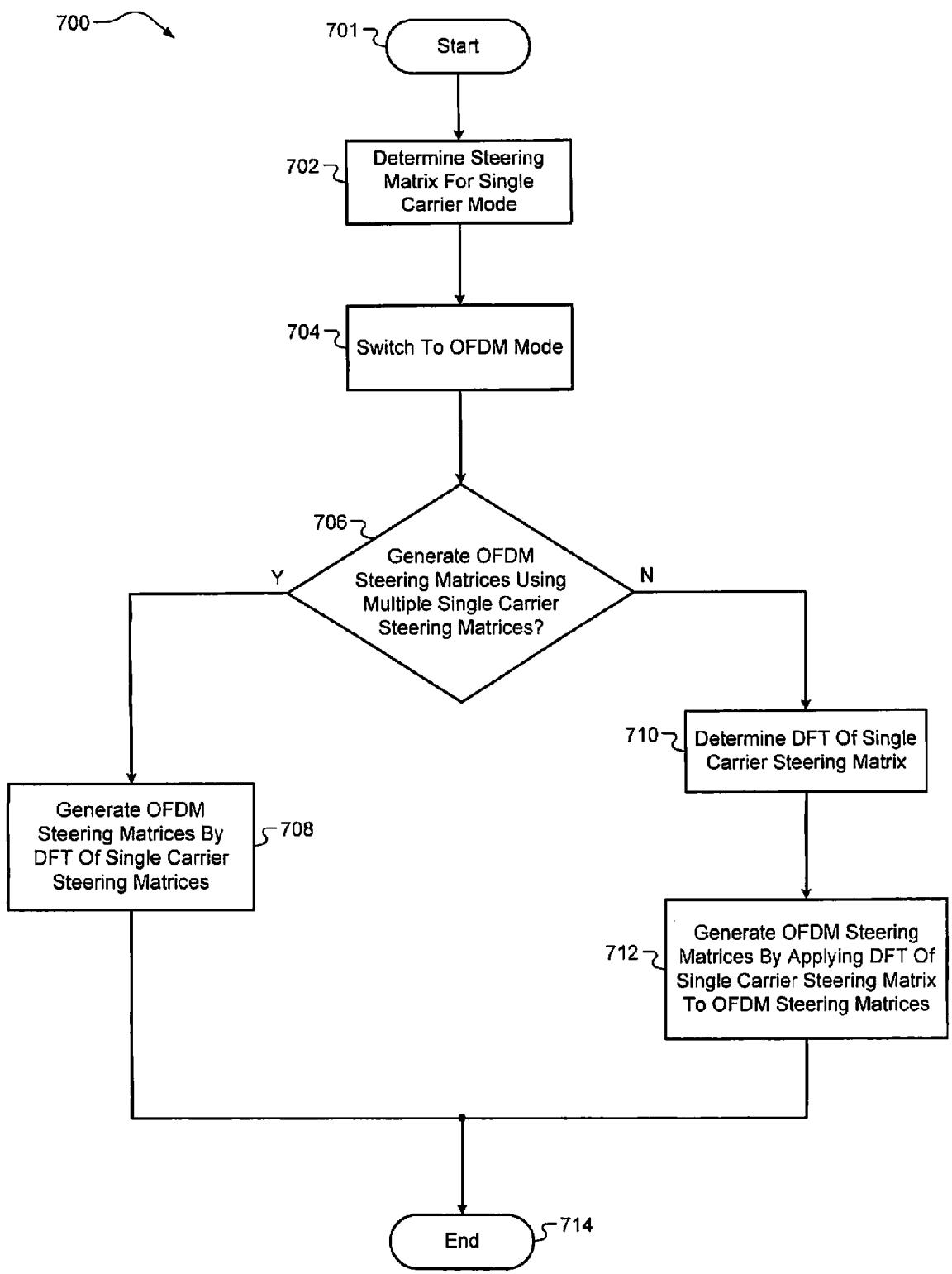
FIG. 7 illustrates a method for generating OFDM steering matrices when the transmitter transitions from the single carrier mode to the OFDM mode.

Referring now to FIG. 7, a method 700 for generating an OFDM steering matrix when a transmitter transitions from the single carrier mode to the OFDM mode begins in step 701. In step 702, the steering determination module 224 determines a single carrier steering matrix. In step 704, the transmitter 202 transitions from the single carrier mode to the OFDM mode.

In step 706, the steering update module 226 determines whether to generate OFDM steering matrices using multiple single carrier steering matrices. If the result of step 706 is true, the method 700 continues with step 708. If the result of step 706 is false, the method 700 continues with step 710.

In step 708, the steering update module 226 generates the OFDM steering matrices by DFT of the single carrier steering matrices. In step 710, the steering update module 226 determines a DFT of the single carrier steering matrix. In step 712, the steering update module 226 generates the OFDM steering matrices by applying the DFT of the single carrier steering matrix to the OFDM steering matrices. The method 700 ends in step 714.

Figure 8:
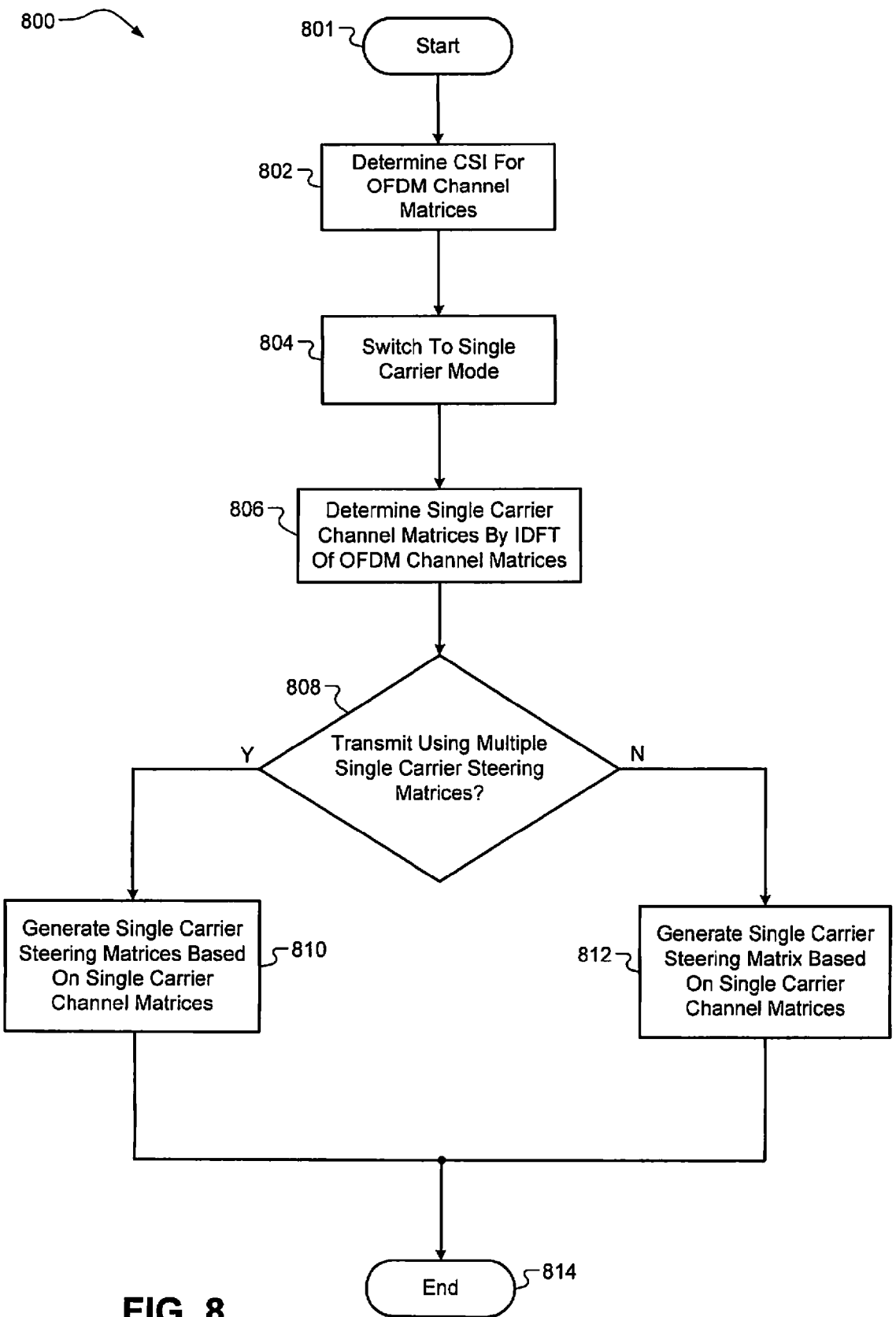
FIG. 8 illustrates a method for generating a single carrier steering matrix based on OFDM channel matrices.

Referring now to FIG. 8, a method 800 for generating a single carrier steering matrix based on OFDM channel matrices starts in step 801. In step 802, the CSI determination module 220 determines the channel state information matrices $H_1 \rightarrow H_k$ in the OFDM mode. In step 804, the transmitter 202 transitions to the single carrier mode. In step 806, the steering update module 226 determines single carrier time domain channel matrices $H(0) \rightarrow H(L-1)$ by IDFT of the matrices $H_1 \rightarrow H_k$.

In step 808, the transmitter 202 determines whether to transmit using multiple single carrier steering matrices. If the result of step 808 is true, the method 800 continues with step 810. If the result of step 808 is false, the method 800 continues with step 812.

In step 810, the steering update module 226 generates the single carrier steering matrices based on the single carrier time domain channel matrices using time-domain beamforming approaches. In step 812, the steering update module 226 generates the single carrier steering matrix V(0) based on the single carrier time-domain channel matrices using time-domain beamforming approaches. The method 800 ends in step 814.

Throughout the disclosure, the IEEE standards IEEE 802.11a, IEEE 802.11b, IEEE 802.11g, and IEEE 802.11n are used for illustration purposes only. The teachings of the disclosure may extend to other standards including The 3$^{RD}$ generation partnership project (3GPP™) and IEEE 802.16e.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A transmitter comprising:
a transmitting module configured to
transmit a first set of data streams using N subcarriers when the transmitter operates in a first mode, wherein the first mode includes a single stream mode, a multiple input multiple output mode, a single carrier mode, or an orthogonal frequency division multiplexing mode; and
transmit a second set of data streams using M subcarriers when the transmitter operates in a second mode, wherein the second mode includes the single stream mode, the multiple input multiple output mode, the single carrier mode, or the orthogonal frequency division multiplexing mode, wherein the second mode is different than the first mode, and where N and M are integers greater than or equal to 1;
a mapping module configured to
map the first set of data streams to a first set of antennas of the transmitter based on a first steering matrix generated by the transmitter; and
map the second set of data streams to a second set of antennas of the transmitter based on a second steering matrix generated by the transmitter;
a channel state determination module configured to determine channel state information in the first mode; and
an updating module configured to, in response to the transmitter transitioning from the first mode to the second mode,
determine channel state information in the second mode based on an inverse discrete Fourier transform of the channel state information determined in the first mode, and
generate the second steering matrix based on (i) the first steering matrix and (ii) the channel state information determined in the second mode.

2. The transmitter of claim 1, wherein in response to N being greater than 1 and M being equal to 1, the mapping module is configured to map the first set of data streams in a frequency domain and map the second set of data streams in a time domain.

3. The transmitter of claim 2, wherein the updating module is configured to generate the second steering matrix based on an inverse discrete Fourier transform of the first steering matrix.

4. The transmitter of claim 3, wherein the updating module is configured to generate the second steering matrix based on a least mean square algorithm in response to the second steering matrix including less mapping values than the first steering matrix.

5. The transmitter of claim 2, wherein in response to the first set of data streams including multiple data streams and the second set of data streams being a single data stream, the updating module is configured to determine an inverse discrete Fourier transform of a subset of the first steering matrix and determine the second steering matrix based on the inverse discrete Fourier transform of the subset of the first steering matrix.

6. The transmitter of claim 1, wherein in response to N being equal 1 and M being greater than 1, the mapping module is configured to map the first set of data streams in a time domain and map the second set of data streams in a frequency domain.

7. The transmitter of claim 6, wherein the updating module is configured to generate the second steering matrix based on a discrete Fourier transform of the first steering matrix.

8. The transmitter of claim 6, wherein the updating module is configured to generate a discrete Fourier transform of the first set steering matrix and set a subset of the second steering matrix equal to the discrete Fourier transform of the first steering matrix.

9. The transmitter of claim 1, further comprising a transmit module configured to deactivate cyclic delay diversity in the first mode and the second mode.

10. The transmitter of claim 1, wherein the updating module is configured to generate the second steering matrix based on the first set steering matrix prior to the transmitter transitioning from the first mode to the second mode.

11. A method comprising:
   transmitting a first set of data streams using N subcarriers when a transmitter operates in a first mode, wherein the first mode includes a single stream mode, a multiple input multiple output mode, a single carrier mode, or an orthogonal frequency division multiplexing mode, and where N is an integer greater than or equal to 1;
   transmitting a second set of data streams using M subcarriers when the transmitter operates in a second mode, wherein the second mode includes the single stream mode, the multiple input multiple output mode, the single carrier mode, or the orthogonal frequency division multiplexing mode, wherein the second mode is different than the first mode, and where M is an integer greater than or equal to 1;
   mapping the first set of data streams to a first set of antennas of the transmitter based on a first steering matrix generated by the transmitter;
   mapping the second set of data streams to a second set of antennas of the transmitter based on a second steering matrix generated by the transmitter; and
   in response to the transmitter transitioning from the first mode to the second mode,
      determining channel state information (CSI) in the first mode;
      determining channel state information in the second mode based on an inverse discrete Fourier transform of the channel state information determined in the first mode; and
      generating the second steering matrix based on the first steering matrix (ii) and the channel state information determined in the second mode.

12. The method of claim 11 further comprising:
   mapping the first set of data streams in a frequency domain in response to N being greater than 1 and M being equal to 1; and
   mapping the second set of data streams in a time domain in response to N being greater than 1 and M being equal to 1.

13. The method of claim 12 further comprising generating the second steering matrix based on an inverse discrete Fourier transform of the first steering matrix.

14. The method of claim 13 further comprising generating the second steering matrix based on a least mean square algorithm in response to the second steering matrix including less mapping values than the first steering matrix.

15. The method of claim 12 further comprising:
   determining an inverse discrete Fourier transform of a subset of the first steering matrix in response to the first set of data streams including multiple data streams and in response to the second set of data streams being a single data stream; and
   determining the second steering matrix based on the inverse discrete Fourier transform of the subset of the first steering matrix in response to the first set of data streams including multiple data streams and in response to the second set of data streams being a single data stream.

16. The method of claim 11 further comprising:
   mapping the first set of data streams in a time domain in response to N being equal 1 and M being greater than 1; and
   mapping the second set of data streams in a frequency domain in response to N being equal 1 and M being greater than 1.

17. The method of claim 16 further comprising generating the second steering matrix based on a discrete Fourier transform of the first steering matrix.

18. The method of claim 16 further comprising:
   generating a discrete Fourier transform of the first steering matrix; and
   setting a subset of the second steering matrix equal to the discrete Fourier transform of the first steering matrix.

19. The method of claim 11 further comprising deactivating cyclic delay diversity in the first mode and the second mode.

20. The method of claim 11, further comprising generating the second steering matrix based on the first steering matrix prior to the transmitter transitioning from the first mode to the second mode.

* * * * *